(12) United States Patent
Yeon et al.

(10) Patent No.: US 11,995,002 B1
(45) Date of Patent: May 28, 2024

(54) ELECTRONIC DEVICE AND COMPUTING SYSTEM INCLUDING SAME

(71) Applicant: METISX CO., LTD., Yongin-si (KR)

(72) Inventors: Jae Wan Yeon, Yongin-si (KR); Ju Hyun Kim, Yongin-si (KR); Gayoung Lee, Yongin-si (KR)

(73) Assignee: METISX CO., LTD., Yongin-si (KR)

( * ) Notice: Subject to any disclaimer, the term of this patent is extended or adjusted under 35 U.S.C. 154(b) by 0 days.

(21) Appl. No.: 18/409,321

(22) Filed: Jan. 10, 2024

(30) Foreign Application Priority Data

Jun. 5, 2023 (KR) .................. 10-2023-0072077

(51) Int. Cl.
*G06F 12/00* (2006.01)
*G06F 12/1009* (2016.01)

(52) U.S. Cl.
CPC .................. *G06F 12/1009* (2013.01)

(58) Field of Classification Search
CPC .. G06F 12/0238; G06F 12/0292; G06F 12/06; G06F 12/1009
See application file for complete search history.

(56) References Cited

U.S. PATENT DOCUMENTS

| 9,727,368 | B1 * | 8/2017 | Tsirkin | G06F 3/067 |
| 2015/0324284 | A1 * | 11/2015 | Kim | G06F 12/02 |
| | | | | 711/103 |

FOREIGN PATENT DOCUMENTS

| KR | 10-2011-0098003 A | 8/2011 |
| KR | 10-2018-0044635 A | 5/2018 |
| KR | 10-2022-0006913 A | 1/2022 |
| KR | 10-2022-0087782 A | 6/2022 |
| KR | 10-2022-0097101 A | 7/2022 |
| KR | 10-2022-0105304 A | 7/2022 |
| KR | 10-2023-0068935 A | 5/2023 |

OTHER PUBLICATIONS

Korean Office Action for Korean Application No. 10-2023-0072077 dated Jul. 31, 2023, 11 Total pages.
Korean Office Action Decision on Registration for Korean Application No. 10-2023-0072077 dated Nov. 9, 2023, 5 Total pages.

* cited by examiner

*Primary Examiner* — Shawn X Gu
(74) *Attorney, Agent, or Firm* — Sughrue Mion, PLLC

(57) ABSTRACT

A byte-addressable electronic device is provided. The electronic device includes a volatile memory device, a mapping table storing address information of the volatile memory device corresponding to address information of a non-volatile storage device, and information indicating whether a command related to data access is processed in relation to the address information of the volatile memory device, and a controller connected to a host processor, the volatile memory device, and the non-volatile storage device, and configured to process commands related to data access received from the host processor based on the mapping table.

13 Claims, 8 Drawing Sheets

900

| | 4K mapping | 64K mapping | tree method | embodiments according to present disclosure |
|---|---|---|---|---|
| mapping entry size | 4 Byte | 4 Byte | 20 Byte | 8 Byte |
| mapping unit size | 4 KB | 64 KB | 4 KB | 64 KB |
| mapping table size | 1/2 (64 GB) | 1/32 (4 GB) | 1/128 (1 GB O[δ]) | 1/16 (8 GB) |
| algorithm complexity | O(1) | O(1) | O(log n) | O(1) |
| write/read amplification | 1 | 16 | 1 | 1 |

…

ELECTRONIC DEVICE AND COMPUTING SYSTEM INCLUDING SAME

CROSS-REFERENCE TO RELATED APPLICATION

This application is based on and claims priority under 35 U.S.C. § 119 to Korean Patent Application No. 10-2023-0072077, filed on Jun. 5, 2023, in the Korean Intellectual Property Office, the disclosure of which is incorporated by reference herein in its entirety.

BACKGROUND

The present disclosure relates to an electronic device and a computing system including the electronic device.

Dynamic random access memory (DRAM), which is a representative byte-addressable memory, may be read and written in units of byte but is more expensive in cost per unit than a block storage and has limitations in expansion. The block storage is cheaper and has higher capacity than DRAM but may not be read or written in units of byte and may operate only in 512 bytes or 4 KB block units.

Data of the block storage may be cached in the DRAM and may be read and written by byte addressability and may be shown to a host as if there is DRAM equal to a size of the block storage. Here, a method of describing a relationship between DRAM and block storage is referred to as mapping, and there is a need to design an algorithm such that advantages of respective devices are fully used.

SUMMARY

The present disclosure provides a mapping structure that may use full advantages of a volatile memory device and a non-volatile storage device.

The present disclosure provides a mapping algorithm that operates quickly, includes a mapping table of a small size, and does not increase write and read amplification.

The present disclosure provides an optimized memory mapping algorithm to increase the entire performance of a system and increase efficiency to reduce total cost of ownership (TCO).

The present disclosure may be implemented in a variety of ways including a device, a system, a method, and a computer program stored in a readable storage medium.

According to an aspect of the present disclosure, a byte-addressable electronic device is provided. The electronic device may include a volatile memory device, a mapping table storing address information of the volatile memory device corresponding to address information of a non-volatile storage device, and information indicating whether a command related to data access is processed in relation to the address information of the volatile memory device, and a controller connected to a host processor, the volatile memory device, and the non-volatile storage device, and configured to process commands related to data access received from the host processor based on the mapping table.

In one embodiment, the mapping table may include a plurality of entries respectively corresponding to a plurality of page numbers of the non-volatile storage device, and each of the plurality of entries may include a page number of the volatile memory device corresponding to a predetermined page number of the non-volatile storage device, a read bitmap indicating whether data at a certain offset position of the page number of the volatile memory device is read, and a write bitmap indicating whether the data at the certain offset position of the page number of the volatile memory device is written.

According to another aspect of the present disclosure, a computing system is provided. The computing system may include a host processor, a byte-addressable electronic device, and a non-volatile storage device, wherein the byte-addressable electronic device includes a volatile memory device, a mapping table storing address information of the volatile memory device corresponding to address information of a non-volatile storage device, and information indicating whether a command related to data access is processed in relation to the address information of the volatile memory device, and a controller connected to the host processor, the volatile memory device, and the non-volatile storage device, and configured to process commands related to data access received from the host processor based on the mapping table.

According to various embodiments of the present disclosure, a mapping structure, which may use full advantages of a volatile memory device and a non-volatile storage device, may be provided.

According to various embodiments of the present disclosure, a mapping algorithm, which operates quickly, includes a mapping table of a small size, and does not increase write and read amplification, may be provided.

According to various embodiments of the present disclosure, an optimized memory mapping algorithm, which increases the entire performance of a system and increases efficiency to reduce total cost of ownership (TCO), may be provided.

Effects of the present disclosure are not limited to the effects described above, and other effects not described may be clearly understood by those (hereinafter referred to as "those skilled in the art") skilled in the art to which the present disclosure belongs from the descriptions of claims.

BRIEF DESCRIPTION OF THE DRAWINGS

Embodiments of the inventive concept will be more clearly understood from the following detailed description taken in conjunction with the accompanying drawings in which.

DETAILED DESCRIPTION OF THE EMBODIMENTS

Figure 1:
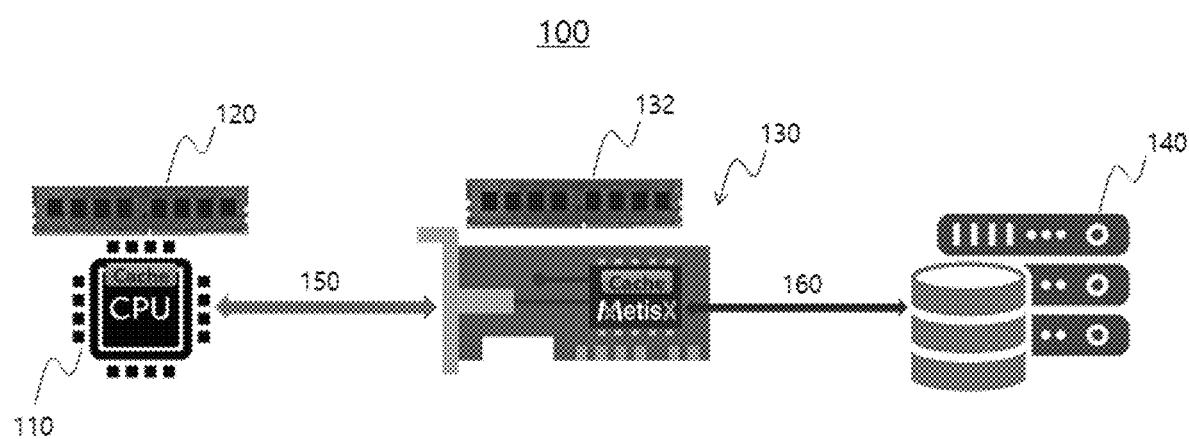
FIG. 1 is an example diagram conceptually illustrating a computing system according to an embodiment of the present disclosure.

Various embodiments set forth herein are illustrated for the purpose of clearly describing the technical ideas of the present disclosure, and are not intended to be limited to particular embodiments. The technical ideas of the present disclosure include various modifications, equivalents, and alternatives of each embodiment set forth herein, and embodiments obtained by selectively combining all or part of each embodiment. In addition, the scope of the technical ideas of the present disclosure is not limited to various embodiments or specific descriptions thereof presented below.

Terms used herein, including technical or scientific terms, may have the meaning commonly understood by those of ordinary skill in the art to which the present disclosure pertains unless defined otherwise.

As used herein, expressions such as "include(s)," "may include," "is/are provided with", "may be provided with," "have/has," "can have," and the like mean that target features (e.g., functions, operations, components, or the like) exist, and do not preclude the presence of other additional features. That is, such expressions should be understood as open-ended terms that imply the possibility of including other embodiments.

Singular expressions herein include plural expressions unless the context clearly dictates that they are singular. Further, plural expressions include singular expressions unless the context clearly dictates that they are plural. Throughout the specification, when a part is said to include a component, this means that it may further include other components rather than excluding other components unless particularly described to the contrary.

Further, the term 'module' or 'part' used herein refers to a software or hardware component, and the 'module' or 'part' performs certain roles. However, the 'module' or 'part' is not meant to be limited to software or hardware. The 'module' or 'part' may be configured to reside on an addressable storage medium or may be configured to run one or more processors. Therefore, as one example, the 'module' or 'part' may include at least one of components such as software components, object-oriented software components, class components, and task components, processes, functions, properties, procedures, subroutines, segments of program code, drivers, firmware, microcode, circuitry, data, databases, data structures, tables, arrays, or variables. Functions provided within the components and the 'modules' or 'parts' may be combined into a smaller number of components and 'modules' or 'parts,' or may be further separated into additional components and 'modules' or 'parts.'

According to one embodiment of the present disclosure, a 'module' or 'part' may be implemented with a processor and a memory. The 'processor' should be interpreted broadly so as to encompass general-purpose processors, central processing units (CPUs), microprocessors, digital signal processors (DSPs), controllers, microcontrollers, state machines, and the like. In some circumstances, the 'processor' may also refer to an application-specific integrated circuit (ASIC), a programmable logic device (PLD), a field programmable gate array (FPGA), or the like. The 'processor' may also refer to, for example, a combination of processing devices, such as a combination of a DSP and a microprocessor, a combination of a plurality of microprocessors, a combination of one or more microprocessors combined with a DSP core, or a combination of any other such components. In addition, the 'memory' should be interpreted broadly so as to encompass any electronic component capable of storing electronic information. The 'memory' may also refer to various types of processor-readable media, such as random-access memory (RAM), read-only memory (ROM), non-volatile random-access memory (NVRAM), programmable read-only memory (PROM), erasable-programmable read-only memory (EPROM), electrically erasable PROM (EEPROM), flash memory, magnetic or optical data storage, registers, etc. A memory is said to be in electronic communication with a processor if the processor can read information from and/or write information to the memory. A memory integrated with a processor is in electronic communication with the processor.

As used herein, expressions such as "first" and "second" are used to distinguish one object from another when referring to a plurality of objects of the same kind unless the context indicates otherwise, and do not limit the order or importance among the relevant objects.

As used herein, expressions such as "A, B, and C," "A, B, or C," "A, B, and/or C," or "at least one of A, B, and C," "at least one of A, B, or C one," "at least one of A, B, and/or C," "at least one selected from A, B, and C," "at least one selected from A, B, or C," and "at least one selected from A, B, and/or C" may mean all possible combinations of each listed item or listed items. For example, "at least one selected from A and B" may refer to all of (1) A, (2) at least one of A's, (3) B, (4) at least one of B's, (5) at least one of A's and at least one of B's, (6) at least one of A's and B, (7) at least one of B's and A, (8) A and B.

As used herein, the expression "based on" is used to describe one or more factors that affect the action or operation of a decision or determination described in the phrase or sentence including the expression, and this expression does not preclude additional factors that affect the action or operation of that decision or determination.

As used herein, the expression that a component (e.g., a first component) is "connected" or "coupled" to another component (e.g., a second component) may mean that said component is connected or coupled to said another component directly, as well as connected or coupled via yet another component (e.g., a third component).

As used herein, the expression "configured to" may have the meaning of "set to," "having the ability to," "modified to," "made to," "capable of," etc., depending on the context. The expression is not limited to the meaning of "designed specifically in hardware," and for example, a processor configured to perform a particular operation may refer to a generic-purpose processor capable of performing that particular operation by executing software.

Hereinafter, various embodiments of the present disclosure will be described with reference to the accompanying drawings. In the accompanying drawings and description of the drawings, identical or substantially equivalent components may be given the same reference numerals. Further, in the description of various embodiments below, repetitive descriptions of the same or corresponding components may be omitted, which, however, does not mean that such components are not included in that embodiment.

FIG. 1 is an example diagram conceptually illustrating a computing system 100 according to an embodiment of the present disclosure.

The computing system 100 according to the present disclosure may be a storage server or another type of server that may be used in a data center. As illustrated in FIG. 1, the computing system 100 may include a host processor 110 (for example, an x86 central processing unit (CPU), ARM, or RISC-V), an electronic device 130, and a non-volatile storage device 140. The host processor 110 may be connected to a host memory 120. The electronic device 130 may include a volatile memory device 132.

The computing system 100 according to the present disclosure may use the volatile memory device 132 of the electronic device 130 as an intermediate storage medium and may have an expandable device structure that may use the non-volatile storage device 140 as a final storage medium. The host processor 110 may recognize the total capacity of the non-volatile storage device 140 connected to the electronic device 130.

The host processor 110 may communicate with the electronic device 130 through a first interface 150. The first interface 150 may be a serial interface, for example, an interface using PCIe or a compute express link (CXL) protocol. The electronic device 130 may communicate with the non-volatile storage device 140 through a second interface 160. The second interface 160 may be a serial interface.

In the computing system 100 according to the present disclosure, the first interface 150 may be a byte-addressable protocol (or a byte addressing protocol), and the second interface 160 may be a block addressable protocol (or a block addressing protocol). The host processor 110 may read and write data from and to the electronic device 130 by designating an address in units of byte. In relation to such characteristics, the electronic device 130 may be referred to as a byte-addressable electronic device. The electronic device 130 may read and write data by designating an address in units of block to the non-volatile storage device 140. The electronic device 130 may read data in units of block from the non-volatile storage device 140 based on a byte address and store the data in the volatile memory device 132 of the electronic device 130. The electronic device 130 may access data corresponding to an address commanded by the host processor 110 among pieces of data stored in the volatile memory device 132.

According to one embodiment, the electronic device 130 may internally have a cache for data stored in the volatile memory device 132 to increase performance.

For the sake of convenience of description, FIG. 1 illustrates that the non-volatile storage device 140 is configured separately from the electronic device 130. However, the present disclosure is not limited thereto. For example, in the present disclosure, the non-volatile storage device 140 may be integrated with the electronic device 130.

Figures 2, 3:
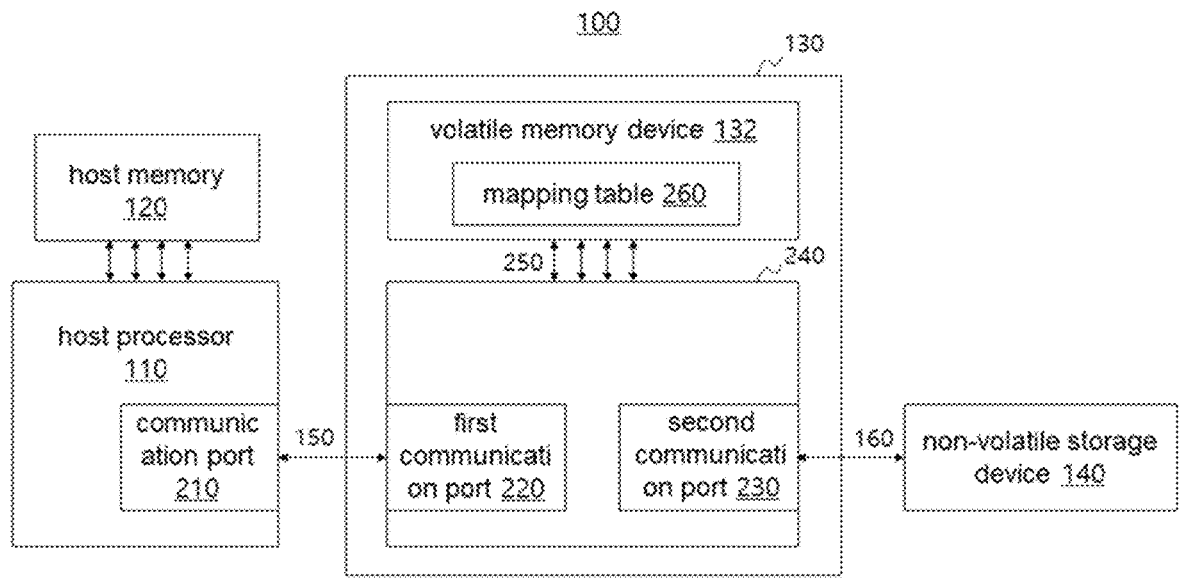
FIG. 2 is a block diagram of a computing system including an electronic device, according to an embodiment of the present disclosure.
FIG. 3 is a diagram illustrating a data structure of a mapping table according to an embodiment of the present disclosure.

FIG. 2 is a block diagram of a computing system 100 including an electronic device 130, according to an embodiment of the present disclosure.

As illustrated in FIG. 2, the computing system 100 includes a host processor 110, an electronic device 130, and a non-volatile storage device 140. The host processor 110 may include a communication port 210. The electronic device 130 may include a volatile memory device 132 and a controller 240.

The host processor 110 may refer to a set of one or more processors. The host processor 110 may execute software (for example, commands, programs, or so on) to control at least one component of a device or terminal (for example, the electronic device 130) connected to the host processor 110. Also, the host processor 110 may perform various operations, such as calculation, processing, and data generation or processing. Also, the host processor 110 may load data and so on from various memory devices or storage devices, or may store data in a memory device or storage device.

The controller 240 may have one or more volatile memory channels and may communicate with individual components or the volatile memory device 132 through the volatile memory channels. The volatile memory device 132 may be, for example, a dual in-line memory module (DIMM)-type dynamic random access memory (DRAM). The controller 240 may include a first communication port 220. For example, the first communication port 220 may be a PCIe end point or a computer express link (CXL) end point. According to one embodiment, the controller 240 may further include a second communication port 230. For example, the second communication port 230 may be a PCIe root complex port.

The controller 240 may communicate with the host processor 110 through a first interface 150, the first communication port 220, and a communication port 210. Also, the controller 240 may communicate with the volatile memory device 132 through a third interface 250. Also, the controller 240 may communicate with the non-volatile storage device 140 through a second interface 160 and a second communication port 230. Here, the first interface 150 and the second interface 160 may be serial interfaces, and the third interface 250 may be a parallel interface.

The controller 240 may communicate with the host processor 110 by using a first protocol. Also, the controller 240 may communicate with the volatile memory device 132 by using a second protocol. Also, the controller 240 may communicate with the non-volatile storage device 140 by using a third protocol. Here, the first and second protocols may be byte-addressable protocols that may read and write data by designating addresses in units of byte, and the third protocol may be a block addressable protocol that may read and write data by designating addresses in units of block.

The non-volatile storage device 140 may include one or more non-volatile storages. According to one embodiment, non-volatile storages that may be allowed by an interface may be directly connected to the second communication port 230. Here, the non-volatile storages may include a hard disk drive (HDD), a solid state drive (SSD), and so on.

The controller 240 according to the present disclosure may receive a command or request related to data access including address information from the host processor 110. The command may be a command for reading or writing data, and may be transmitted through the communication port 210 and the first communication port 220. The controller 240 may communicate with the volatile memory device 132 and the non-volatile storage device 140 to process data access commands.

The electronic device 130 according to the present disclosure may include a mapping table 260. The mapping table 260 may refer to a set of data or pieces of information indicating a relationship between the volatile memory device 132 and the non-volatile storage device 140. For example, when data stored in the non-volatile storage device 140 is cached or stored in the volatile memory device 132, a positional relationship between different devices for corresponding data is stored in the mapping table 260 in the form of metadata. According to one embodiment, the mapping table 260 may include address information of the volatile memory device 132 corresponding to the address information of the non-volatile storage device 140, information indicating whether a command related to data access is processed is stored in relation to address information of the memory device 132, and so on. Although FIG. 2 illustrates an example in which the mapping table 260 is included (stored) in the volatile memory device 132, the present disclosure is not limited thereto. For example, the mapping table 260 may be included in the controller 240 or may be implemented by a separate memory in the electronic device 130.

FIG. 3 is a diagram illustrating a data structure of the mapping table 260 according to an embodiment of the present disclosure.

According to the present disclosure, the mapping table 260 includes a plurality of entries 320, each corresponding to a plurality of page numbers BPNs 310 of the non-volatile storage device 140. In the present disclosure, a term page number (BPN) of the non-volatile storage device 140 may include not only a block page number of the non-volatile storage device 140 but also information that may indicate an address or an address range of the non-volatile storage device 140. Each of the plurality of entries 320 includes a read bitmap 322, a write bitmap 324, and a page number (BPN) 326 of the volatile memory device 132. In the present disclosure, the term page number (DPN) of the volatile memory device 132 may include not only a DRAM page number of the volatile memory device 132 but also information that may indicate an address or address range of the volatile memory device 132.

The volatile memory page number (BPN) 326 may correspond to the page number (BPN) 310 of the non-volatile storage device 140. The read bitmap 322 may indicate whether to read data at a specific offset position of the page number (BPN) 326 of the volatile memory device 132. Also, the write bitmap 324 may indicate whether to read data at a specific offset position of the page number (BPN) 326 of the volatile memory device 132.

According to one embodiment, a size of each of the plurality of entries 320 may be equal to a unit by which the host processor 110 accesses the volatile memory device 132 once. For example, the size of each of the plurality of entries 320 may be 4 bytes or 8 bytes. A unit size of the mapping table 260 may be set to be greater than a page unit (for example, 4 KB). Here, the unit size of the mapping table 260 may indicate a size of the non-volatile storage device 140 corresponding to each of the plurality of entries 320. Alternatively, the unit size of the mapping table 260 may indicate a size corresponding to an interval between a plurality of page numbers (BPNs) 310 of the non-volatile storage device 140. According to one embodiment, the unit size of the mapping table 260 may be a value obtained by multiplying a page unit by m, where m is a natural number (m=1, 2, 3, . . . ). According to another embodiment, the unit size of the mapping table 260 may be a value obtained by multiplying the page unit by $2^n$, where n is a natural number (n=1, 2, 3, . . . ). For example, the unit size may be 64 KB.

According to one embodiment, the read bitmap 322 and the write bitmap 324 may be composed of a predetermined number of bits. For example, when the size of each of the plurality of entries 320 is 4 bytes and the page number (BPN) 326 of the volatile memory device 132 is composed of 28 bits, the read bitmap 322 and the write bitmap 324 may each be composed of 2 bits. In another example, when the size of each of the plurality of entries 320 is 8 bytes and the page number (BPN) 326 of the volatile memory device 132 is composed of 4 bytes, the read bitmap 322 and the write bitmap (324) may each be composed of 2 bytes.

The read bitmap 322 according to the present disclosure may be composed of m bits, and the write bitmap 324 may be composed of n bits. Here, m and n may be the same value or may be different values. According to one embodiment, when a data unit for reading data and a data unit for writing data are set to be different from each other, m and n may have different values. For example, when the unit size of the mapping table is 64 K and read and write are set to be performed respectively in units of 16 K and 4 K, the read bitmap 322 and the write bitmap 324 may be respectively composed of 4 bits and 16 bits. In this way, by setting the data unit for reading data to be relatively large, a size of the read bitmap 322 may be reduced. The present disclosure is not limited to reducing a size of the read bitmap 322 as in the above example and is also possible to reduce a size of the write bitmap 324.

In the read bitmap 322, setting an x-th bit ($0 \leq x \leq m-1$) from the least significant bit (LSB) may mean that data at an x-th offset position in the page number (BPN) 326 of the volatile memory device 132 is read. Similarly, in the write bitmap 324, setting an x-th bit ($0 \leq x \leq n-1$) from the least significant bit (LSB) may mean that data at an x-th offset position in the page number (BPN) 326 of the volatile memory device 132 is written. Here, setting a certain bit may mean that a value of a corresponding bit is "1", and clearing a certain bit may mean that a value of a corresponding bit is "0".

Referring to FIG. 3, the read bitmap 322 and the write bitmap 324 of the mapping table 260 is each composed of 2 bytes. The first entry 330 may mean that an address or address range where the page number (BPN) 310 of the non-volatile storage device 140 is "0" corresponds to an address or address range where the page number (BPN) 310 of the volatile storage device 132 is "3". Also, in relation to a read bitmap and a write bitmap of the first entry 330, the data at a 0-th offset position from an address where the page number (BPN) 326 of the volatile memory device 132 is "3" is read, and the data at 0-th and third offset positions are written. A second entry 340 may mean that an address or address range where the page number (BPN) 310 of the non-volatile storage device 140 is "1" corresponds to an address or address range where the page number (BPN) 326 of the volatile memory device 132 is "0". Also, in relation to a read bitmap and a write bitmap of the second entry 340, the data at second and fifth offset positions from the address where the page number (BPN) 326 of the volatile memory device 132 is '0' is read and the data at second and third offset positions are written.

Figure 4:
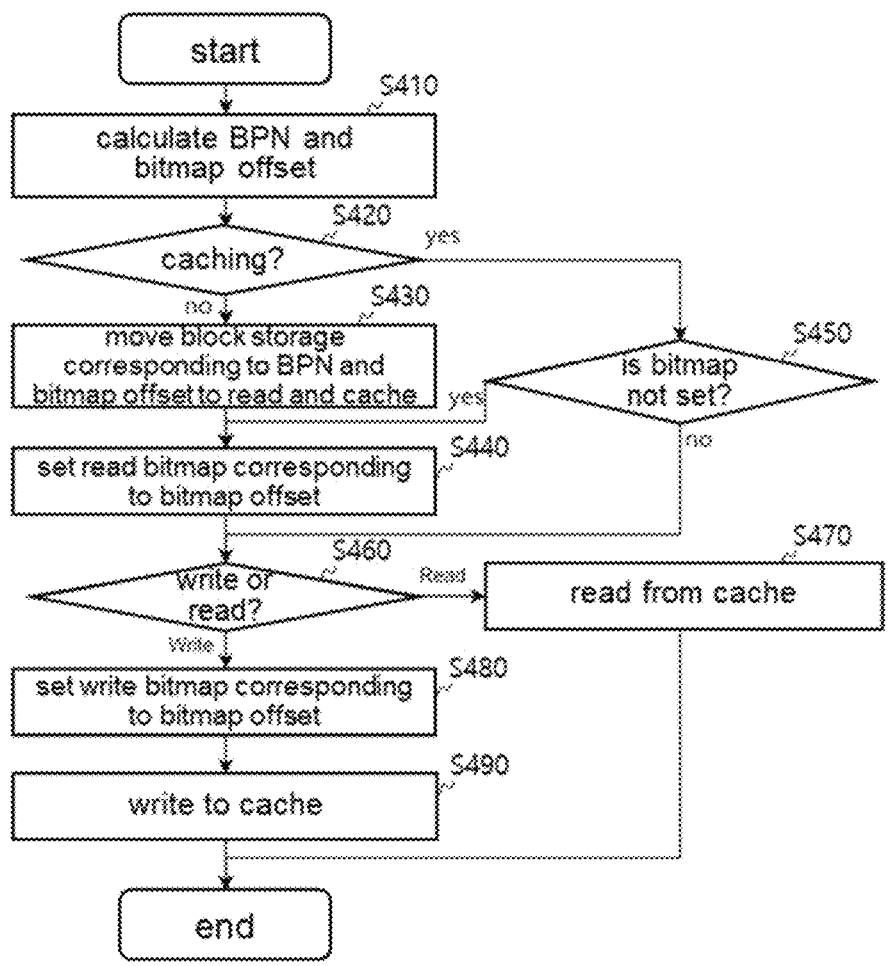
FIG. 4 is a flowchart illustrating a process in which a controller processes commands related to data access by using a mapping table, according to an embodiment of the present disclosure.

FIG. 4 is a flowchart illustrating a process in which the controller 240 processes commands related to data access by using the mapping table 260, according to an embodiment of the present disclosure.

The controller 240 calculates the page number (BPN) and a bitmap offset of the non-volatile storage device 140 (S410). According to one embodiment, the controller 240 calculates the page number (BPN) and a bitmap offset of the non-volatile storage device 140 based on the address included in the command related to data access received from the host processor 110. The page number (BPN) of the non-volatile storage device 140 may be related to a quotient of dividing an address included in a command related to data access by a unit size of the mapping table 260. Also, the bitmap offset may be related to a quotient of dividing an address included in a command related to data access by a unit size of the mapping table 260. For example, the bitmap offset may be a value obtained by dividing the remainder of dividing an address included in a command related to data access by a unit size of the mapping table 260 by a smallest mapping unit size (for example, 4 KB).

Next, the controller 240 determines whether there is caching (S420). According to one embodiment, the controller 240 may determine whether predetermined data corresponding to the page number (BPN) and the bitmap offset of the non-volatile storage device 140 calculated by using the mapping table 260 is cached in the volatile memory device 132. When it is determined in the determination step S420 that a corresponding data is not cached in the volatile memory device 132, the controller 240 may read block storage corresponding to the calculated page number (BPN) and bitmap offset of the non-volatile storage device 140 and cache in the volatile memory device 132 (S430). Also, the controller 240 may set a read bitmap corresponding to the bitmap offset (S440). When it is determined in the determination step S420 that a corresponding data is cached in the volatile memory device 132, the controller 240 determines whether the bitmap is not set (S450). When the bitmap is set (no in S450), the processing proceeds to a determination step S460 on commands related to data access. When the bitmap is not set (yes in S450), a read bitmap corresponding to the bitmap offset is set (S440), and the processing proceeds to the determination step S460.

Next, the controller 240 determines whether a command related to data access is a read command or a write command (S460). When it is determined that the command is a read command in the determination step S460, the controller 240 reads the command from the volatile memory device 132 (S470). According to one embodiment, the controller 240 may read data cached in the volatile memory device 132 and transmit the read data to the host processor 110. When it is determined that the command is a write command in the determination step S460, the controller 240 sets a write bitmap corresponding to the bitmap offset (S480). Next, the controller 240 writes the write bit map to the volatile memory device 132 (S490). According to one embodiment, the controller 240 may update the data cached in the volatile memory device 132 based on a write command.

Figure 5:
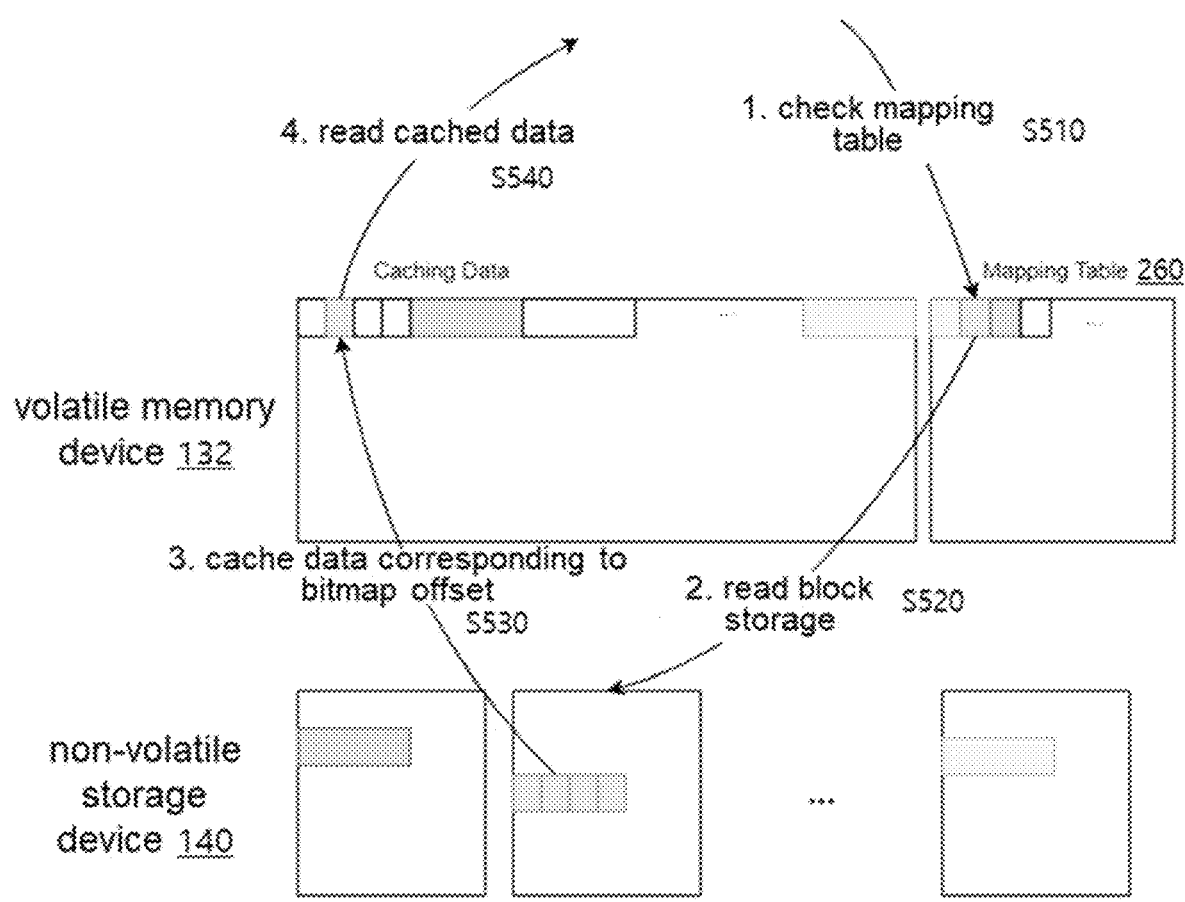
FIG. 5 is a diagram conceptually illustrating a process in which a controller reads and processes data stored in a non-volatile storage device, according to an embodiment of the present disclosure.

FIG. 5 is a diagram conceptually illustrating a process in which the controller 240 reads the data stored in the non-volatile storage device 140, according to an embodiment of the present disclosure. The processing illustrated in FIG. 5 may be at least partially related to step S410, step S420, step S430, step S440, step S460, and step S470 of FIG. 4.

The controller 240 checks the mapping table 260 (S510). The controller 240 may check the mapping table 260 based on address information included in a read command from the host processor 110. As a result of checking the mapping table 260, the controller 240 may determine that a corresponding data is not cached in the volatile memory device 132.

The controller 240 may a read block storage (S520). The controller 240 may read data corresponding to the page number (BPN) and bitmap offset of the non-volatile storage device 140 calculated from an address included in a read command, from the non-volatile storage device 140. Also, the controller 240 may cache the data read from the non-volatile storage device 140 in the volatile memory device 132 (S530). The controller 240 may express that data is cached by setting a read bitmap corresponding to the bitmap offset. Next, the controller 240 may transmit the data cached in the volatile memory device 132 to the host processor 110 (S540).

Figure 6:
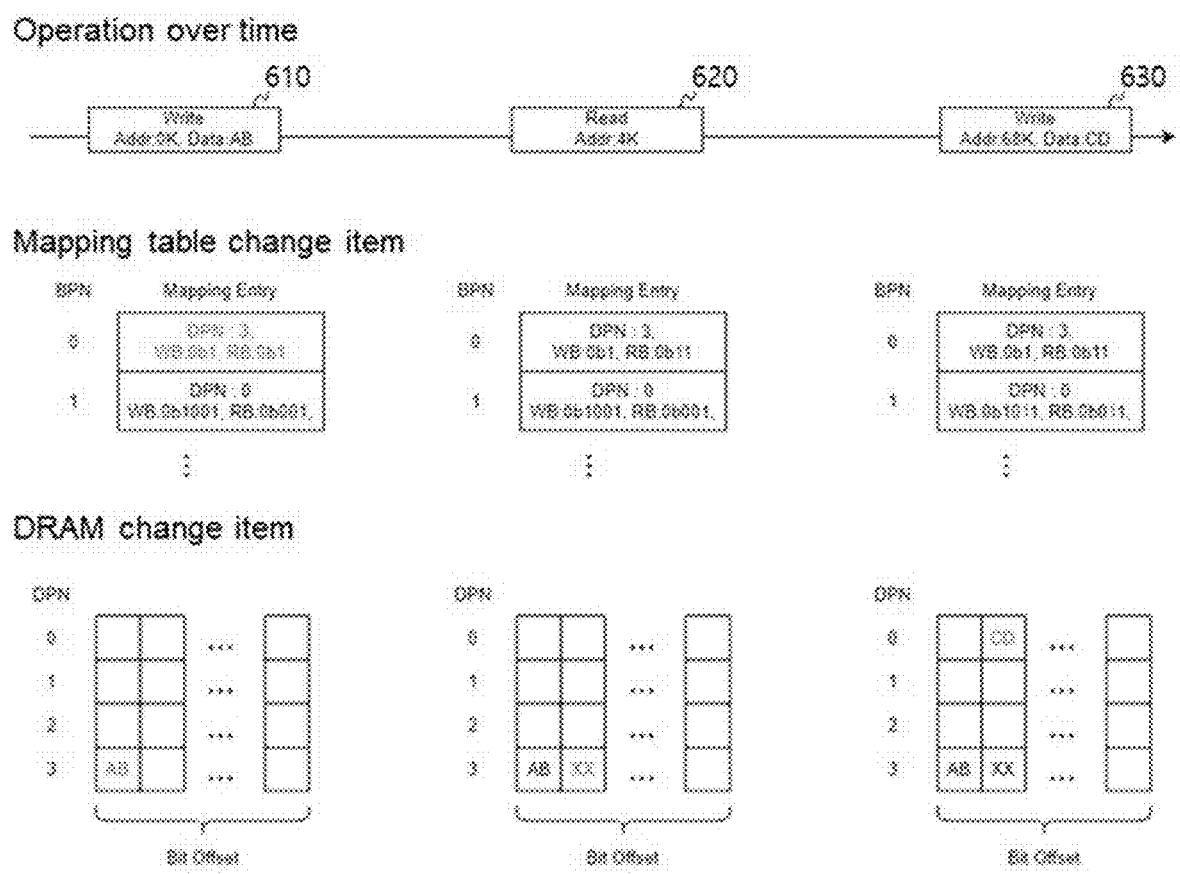
FIG. 6 is a diagram illustrating changes in a mapping table and a volatile memory device according to commands related to data access, according to an embodiment of the present disclosure.

FIG. 6 is a diagram illustrating changes in the mapping table 260 and the volatile memory device 132 according to commands related to data access, according to an embodiment of the present disclosure. In FIG. 6, it is assumed that a unit size of the mapping table 260 is set to 64 KB and a smallest mapping unit size is 4 KB.

The electronic device 130 sequentially receives a first command 610, a second command 620, and a third command 630 from the host processor 110. The first command 610 is a write command, and an address and data are respectively 0 K and "AB". The controller 240 of the electronic device 130 calculates the page number (BPN) and a bitmap offset of the non-volatile storage device 140 from the address of 0 K. For example, the controller 240 may determine 0, which is a quotient of dividing 0 K by 64 K that is a unit size of the mapping table 260, as the page number (BPN) of the non-volatile storage device 140, and may determines 0, which is a remainder of dividing 0 K by 64 K that is a unit size of the mapping table 260, as the bitmap offset.

The controller 240 determines that data corresponding to the page number (BPN) and bitmap offset of the non-volatile storage device 140 is not cached in the volatile memory device 132, by using the mapping table 260. According to this determination, the controller 240 may read data, in which a page number (BPN) and a bitmap offset of the non-volatile storage device 140 is each 0, from the non-volatile storage device 140 and cache in a region where the page number (DPN) and the bitmap offset are respectively 3 and 0. The controller 240 updates the page number (DPN) of the volatile memory device 132 to 3 in the entry in which the page number (BPN) of the non-volatile storage device 140 is 0 in the mapping table 260. Also, because the bitmap offset is 0, the controller 240 sets the least significant bit (LSB) of the read bitmap. Also, the controller 240 updates a corresponding data cached in the volatile memory device 132 to "AB" and sets the least significant bit (LSB) of the write bitmap.

The second command 620 is a read command, and an address thereof is 4 K. The controller 240 of the electronic device 130 calculates the page number (BPN) and bitmap offset of the non-volatile storage device 140 from the address of 4 K. For example, the controller 240 may determine 0, which is a quotient of dividing 4 K by 64 K that is a unit size of the mapping table 260, as the page number (BPN) of the non-volatile storage device 140. Also, the controller 240 may determine 1 that is a value obtained by dividing 4 K, which is a remainder of dividing 4 K by 64 K that is a unit size of the mapping table 260, by 4 K that is a smallest mapping unit size, as the bitmap offset.

The controller 240 to determine that data corresponding to the page number (BPN) and bitmap offset of the non-volatile storage device 140 is not cached in the volatile memory device 132, by using the mapping table 260. According to this determination, the controller 240 reads data "XX", in which the page number (BPN) and bitmap offset of the non-volatile storage device 140 are respectively 0 and 1, from the non-volatile storage device 140 and caches in a region where the page number (DPN) and bitmap offset of the volatile memory device 132 are respectively 3 and 1. Because the bitmap offset is 1, the controller 240 sets the first bit from the least significant bit (LSB) of the read bitmap.

The third command 630 is a write command, and an address and data thereof are respectively 68 K and "CD". The controller 240 of the electronic device 130 calculates the page number (BPN) and bitmap offset of the non-volatile storage device 140 from the address of 68 K. For example, the controller 240 may determine 1, which is a quotient of dividing 68 K by 64 K that is a unit size of the mapping table 260, as the page number (BPN) of the non-volatile storage device 140. Also, the controller 240 may determine 1, which is a value obtained by dividing 4 K that is a remainder of dividing 68 K by 64 K that is a unit size of the mapping table 260 by 4 K that is a smallest mapping unit size, as the bitmap offset.

The controller 240 determines that data corresponding to the page number (BPN) and bitmap offset of the non-volatile storage device 140 is cached in a page number (DPN) 0 of the volatile memory device 132, by using the mapping table 260. For example, the controller 240 determines that the bitmap is not set and sets the first bit in the least significant bit (LSB) of the read bitmap. Also, the controller 240 updates a corresponding data of the volatile memory device 132 to "CD" and sets the first bit in the least significant bit (LSB) of the write bitmap.

Figure 7:
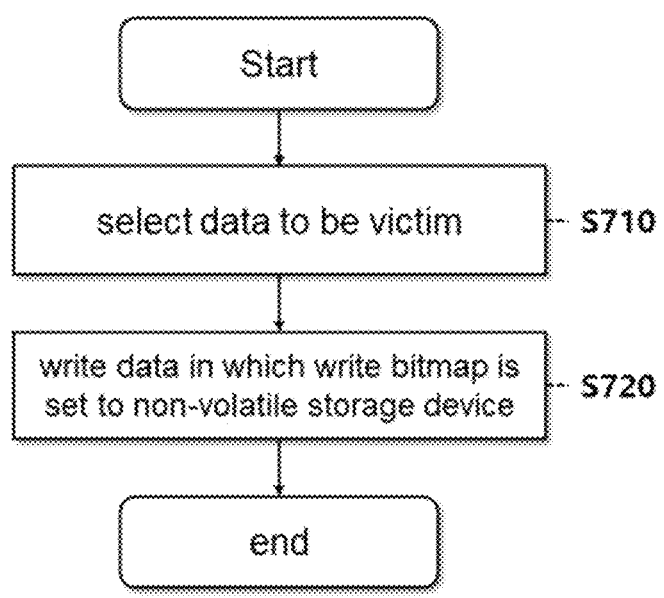
FIG. 7 is a flowchart illustrating a process in which a controller processes a flush command, according to an embodiment of the present disclosure.

FIG. 7 is a flowchart illustrating a process in which the controller 240 processes a flush command, according to an embodiment of the present disclosure.

The controller 240 selects data to become a victim (S710). According to one embodiment, the host processor 110 may issue a flush command. According to another embodiment, the controller 240 may generate a flush command on its own. In response to the flush command, the controller 240 may select data to become a victim by using the mapping table 260. To this end, the controller 240 may identify data in which a write bitmap is set in the mapping table 260. For example, in the mapping table 260 in which the third command 630 of FIG. 6 is processed, data in which a page number (DPN) of the volatile memory device 132 is 3 and a bitmap offset is 0, and data in which a page number (DPN) of the volatile memory device 132 is 0 and bitmap offsets are respectively 0, 1, and 3 may be identified as data that will become a victim.

Next, the controller 240 writes data with a set write bitmap to the non-volatile storage device 140 (S720). According to one embodiment, the controller 240 may write only the data in which a write bitmap is set in the mapping table 260 to the non-volatile storage device 140, and may not write the data in which a write bitmap is cleared to the non-volatile storage device 140. For example, the controller 240 may write the data in which a page number (DPN) of the volatile memory device 132 is 3 and a bitmap offset of the volatile memory device 132 is 0 in the mapping table 260 in which the third command 630 of FIG. 6 is processed, to a block region where a page number (BPN) of the non-volatile storage device 140 is 0 and a bitmap offset of the non-volatile storage device 140 is 0. Also, the controller 240 may write the data in which a page number (DPN) of the volatile memory device 132 is 0 and bitmap offsets are respectively 0, 1, and 3 in the mapping table 260 where the third command 630 of FIG. 6 is processed, to a block region where a page number (BPN) of the non-volatile storage device 140 is 1 and bitmap offsets are respectively 0, 1, and 3.

Figure 8:
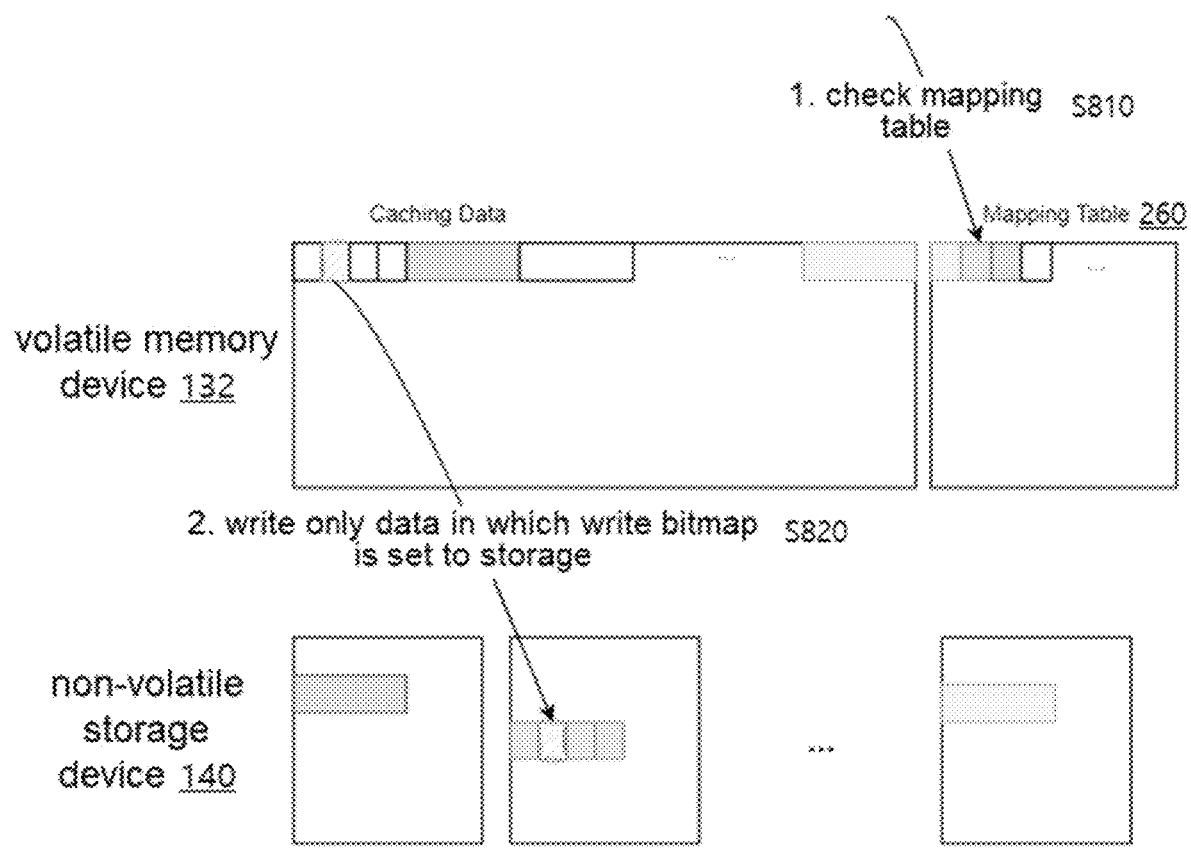
FIG. 8 is a diagram conceptually illustrating a process in which a controller flushes data stored in a volatile memory device, according to an embodiment of the present disclosure.

FIG. 8 is a diagram conceptually illustrating a process in which the controller 240 flushes the data stored in the volatile memory device 132, according to an embodiment of the present disclosure. The processing of FIG. 8 may be related to the steps of FIG. 7.

The controller 240 checks the mapping table 260 (S810). The controller 240 may check the mapping table 260 according to a flush command received from the host processor 110 or a flush command generated by the controller 240 itself. As a result of checking the mapping table 260, the controller 240 may determine data to become a victim. According to one embodiment, the data to become a victim may be the data in which a write bitmap is set in the mapping table 260.

The controller 240 may write only the data in which a write bitmap is set, to the non-volatile storage device 140 (S820). The controller 240 may write only the data in which a write bitmap is set in the mapping table 260, to the non-volatile storage device 140 and may not write the data in which a write bitmap is cleared, to the non-volatile storage device 140.

The methods according to the present disclosure may be methods that may be implemented by a computer. In the present disclosure, although respective steps of corresponding methods are illustrated and described in a predetermined order, the respective steps may also be performed in any order that may be randomly combined according to the present disclosure in addition to being performed sequentially. In one embodiment, at least some of the respective steps may be performed in parallel, iteratively, or heuristically. The present disclosure does not exclude making changes or modifications to the methods. In one embodiment, at least some steps may be omitted or other steps may be added thereto.

Figures 9, 10:
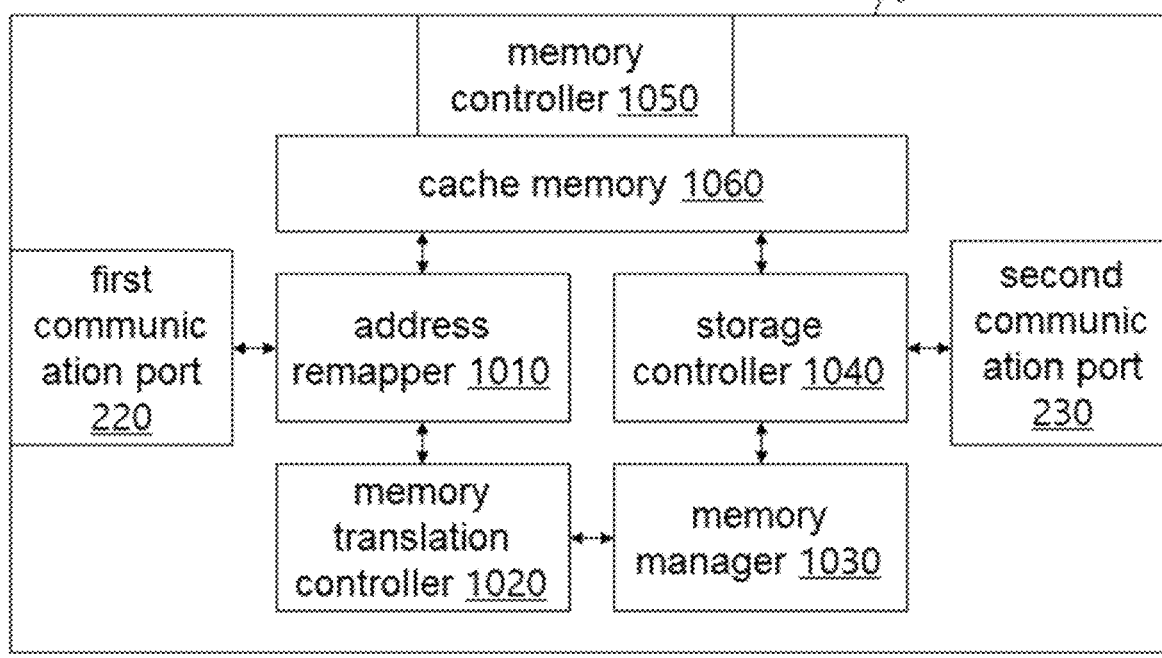
FIG. 9 is a table illustrating technical effects of a mapping structure according to an embodiment of the present disclosure.
FIG. 10 is a block diagram of a controller according to an embodiment of the present disclosure.

FIG. 9 is a table 900 illustrating technical effects of a mapping structure according to an embodiment of the present disclosure.

A difference between the mapping method according to the present disclosure and other mapping methods will be described with reference to FIG. 9. Here, other mapping methods may be conventional mapping methods. In FIG. 9, it is assumed that a size of the volatile memory device 132 is 128 GB and ae size of the non-volatile storage device 140 is 64 TB.

4K mapping is a method using a direct mapping table based on a general page size of 4 KB. In the case of the 4K mapping method, data may be found immediately through one-time access to the volatile memory device 132, and accordingly, algorithm complexity is O(1). However, a size of a mapping table may greatly increase, and approximately 1/1,000 of the capacity of the non-volatile storage device 140 may be consumed as metadata. For example, when mapping a block storage of 64 TB, a mapping table size of 64 GB is required, and accordingly, a cache operation may require a volatile memory device 132 of at least 64 GB.

When a mapping unit size is increased, for example, when a 64K mapping method is adopted, the mapping table size may be reduced to 1/16 compared to the 4K mapping method. However, in the case of the 64K mapping method, write and read are performed to be smaller than the mapping size, and accordingly, there is a disadvantage that write and read amplification increases by up to 16 times. As a result, a lifespan of the non-volatile storage device 140 may be reduced.

A tree method may be adopted to maintain mapping as large as the volatile memory device 132 in which mapping is actually performed, rather than having a mapping table as large as the non-volatile storage device 140. In this case, the mapping size may be reduced. However, in the worst case, data has to be found through access to the volatile memory device 132 as deep as the tree, there is a problem that the delay required to access the actual desired data increases.

In the present disclosure, in order to find a position of data as quickly as possible, a mapping table method rather than the tree method is basically adopted. In order to reduce a size of a mapping table, a mapping unit size has to be increased. However, when the mapping unit size is increased, a problem may occur in which write and read amplification increases, however, the embodiment according to the present disclosure proposes a type of mapping in which mapping information is combined with a minimal context to prevent write and read amplification from increasing.

In one embodiment of the present disclosure, a write bitmap and a read bitmap are added to a free space or an additional space of a page number (DPN) of the volatile memory device 132 in an entry of a mapping table, and a mapping unit size is increased. When performing write or read, a bitmap is used to operate as a minimum mapping unit, and thus, the write and read amplification cost may be reduced. In the method according to the present disclosure, performance speed is increased and a mapping unit size is increased compared to other methods, and thus, a mapping table size is reduced, and write and read amplification does not increase because write or read to or from the actual non-volatile storage device 140 is performed in units of minimum mapping. That is, the mapping methods according to various embodiments of the present disclosure may satisfy all requirements for mapping table size, algorithm complexity, and write and read amplification.

FIG. 10 is a block diagram of the controller 240 according to an embodiment of the present disclosure.

As illustrated in FIG. 10, the controller 240 may include an address remapper 1010 and a memory translation controller 1020. The controller 240 may receive a read or write command including address information from the host processor 110 through the first communication port 220. The address remapper 1010 may determine whether data corresponding to a byte-unit address included in the command is cached in the volatile memory device 132 based on the mapping table 260.

When it is determined that the data is cached in the volatile memory device 132, the address remapper 1010 may translate the byte-unit address into a physical address (or volatile memory address) of the volatile memory device 132. The address remapper 1010 transmit the translated address to the host processor 110 such that the host processor 110 may access the data of the volatile memory device 132. When it is determined that the data is not stored in the volatile memory device 132, the address remapper 1010 may transmit byte-unit address information received from the host processor 110 to the memory translation controller 1020.

The memory translation controller 1020 may generate or manage the mapping table 260 used by the address remapper 1010. The mapping table 260 may be stored in one region of the volatile memory device 132. The memory translation controller 1020 may determine and perform a memory translation operation between the volatile memory device 132 and the non-volatile storage device 140. The memory translation controller 1020 may update the mapping table 260 according to the memory translation operation. The updated mapping table 260 may be used by the address remapper 1010.

The memory translation controller 1020 may determine whether to cache certain data stored in the non-volatile storage device 140 to the volatile memory device 132. According to one embodiment, the memory translation controller 1020 may determine that data expected to be called by the host processor 110 among the pieces of data stored in the non-volatile storage device 140 is brought to the volatile memory device 132. For example, the data expected to be called may be associated with a working set with a usage frequency higher than a threshold. The memory translation controller 1020 may read data from the non-volatile storage device 140 and store the read data in the volatile memory device 132. In this case, the memory translation controller 1020 may cause a block address of the non-volatile storage device 140 where data is located with a byte address of the volatile memory device 132 where the data is stored, and store the associated addresses in the mapping table 260.

The memory translation controller 1020 may determine whether to transmit a predetermined data cached in the volatile memory device 132 to the non-volatile storage device 140 or to copy the predetermined data. According to one embodiment, the memory translation controller 1020 may determine that data that is not expected to be called by the host processor 110 among pieces of data stored in the volatile memory device 132 is transmitted to the non-volatile storage device 140. For example, the data that is not expected to be called may be associated with a data set with a usage frequency less than a threshold. The memory translation controller 1020 may remove the data transmitted to the non-volatile storage device 140 from the volatile memory device 132. In this case, the memory translation controller 1020 may remove the block address of the non-volatile storage device 140 and the byte address of the volatile memory device 132 that are stored in association with each other in the mapping table 260.

The controller 240 according to the present disclosure may further include a memory manager 1030 and a storage controller 1040. The memory manager 1030 may allocate volatile memory necessary for a memory translation operation. The memory manager 1030 may secure an empty space in the volatile memory device 132. According to one embodiment, in response to the memory translation controller 1020 determining that predetermined data stored in the non-volatile storage device 140 is transmitted to the volatile memory device 132, the memory manager 1030 may allocate an empty space corresponding to a block size to the volatile memory device 132.

The storage controller 1040 may drive the non-volatile storage device 140 according to the determination of the memory translation controller 1020 to perform data read or data write by designating an address in units of block. According to one embodiment, in response to the memory translation controller 1020 determining that predetermined data stored in the non-volatile storage device 140 is transmitted to the volatile memory device 132 and in response to the memory manager 1030 allocating a free space corresponding to a block size to the volatile memory device 132, the storage controller 1040 may drive the non-volatile storage device 140 to read block data from the non-volatile storage device 140.

The controller 240 according to the present disclosure may further include a cache memory 1060 and a memory controller 1050. The cache memory 1060 may store data that previously accessed or is expected to access. According to one embodiment, the cache memory 1060 may be implemented by static random access memory (SRAM). The controller 240 may achieve an increase in performance, especially an increase in read and write speeds, by further including the cache memory 1060. The memory controller 1050 may be connected to the volatile memory device 132 and the cache memory 1060.

The address remapper 1010, the memory translation controller 1020, the memory manager 1030, the storage controller 1040, and the memory controller 1050 illustrated in FIG. 10 may each be implemented by a hardware device or software codes. According to one embodiment, the address remapper 1010 may be implemented by a hardware device, and the other components may be implemented by software codes. According to another embodiment, the address remapper 1010 and the memory translation controller 1020 may be implemented by hardware devices, and the other components may be implemented by software codes. Also, FIG. 10 illustrates configurations of the controller 240 by way of example, and the present disclosure is not limited thereto. For example, some of the configurations illustrated in FIG. 10 may be omitted or a function of a specific configuration may be included in another configuration.

The methods in accordance with the present disclosure may be computer-implemented methods. Although each step of the corresponding methods has been shown and described in a given order in the present disclosure, the respective steps may also be performed in an order that can be combined arbitrarily according to the present disclosure, in addition to being performed in sequence. In one embodiment, at least some of the steps may be performed in parallel, iteratively, or heuristically. The present disclosure does not exclude making changes or modifications to the methods. In one embodiment, at least some of the steps may be omitted or other steps may be added.

Various embodiments of the present disclosure may be implemented as software recorded on a machine-readable recording medium. The software may be software for implementing the various embodiments of the present disclosure described above. Software may be inferred from the various embodiments of the present disclosure by programmers skilled in the art to which the present disclosure pertains. For example, the software may be machine-readable commands (e.g., code or code segments) or programs. A machine is a device capable of operating according to instructions called from a recording medium, and may be, for example, a computer. In one embodiment, the machine may be the multiprocessor system 100, a component thereof, or a combination of components thereof in accordance with the embodiments of the present disclosure. In one embodiment, the processor of the machine may execute the called command and cause the components of the machine to perform functions corresponding to the command. The recording medium may refer to any type of recording medium on which data readable by a machine are stored. The recording medium may include, for example, ROM, RAM, CD-ROM, magnetic tapes, floppy disks, optical data storage devices, and the like. In one embodiment, the recording medium may be implemented in a distributed form over networked computer systems or the like. The software may be stored in a distributed manner and executed on a computer system or the like. The recording medium may be a non-transitory recording medium. A non-transitory recording medium refers to a tangible medium regardless of whether data is stored in it semi-permanently or temporarily, and does not include signals propagating in a transitory manner.

Although the technical idea of the present disclosure has been described by various embodiments above, the technical idea of the present disclosure includes various substitutions, modifications, and changes that can be made within the scope that can be understood by those skilled in the art to which the present disclosure pertains. Further, it is to be understood that such substitutions, modifications, and changes may fall within the scope of the appended claims. The embodiments in accordance with the present disclosure may be combined with each other. The respective embodiments may be combined in various ways according to the number of cases, and the combined embodiments also fall within the scope of the present disclosure.

What is claimed is:

1. An electronic device that is byte-addressable, comprising:
   a volatile memory device;
   a mapping table storing address information of the volatile memory device corresponding to address information of a non-volatile storage device, and information indicating whether a command related to data access is processed in relation to the address information of the volatile memory device; and
   a controller connected to a host processor, the volatile memory device, and the non-volatile storage device, and configured to process commands related to data access received from the host processor based on the mapping table,
   wherein the mapping table includes a plurality of entries respectively corresponding to a plurality of page numbers of the non-volatile storage device, and
   each of the plurality of entries includes:
   a page number of the volatile memory device corresponding to a predetermined page number of the non-volatile storage device;
   a read bitmap indicating whether data at a certain offset position of the page number of the volatile memory device is read; and
   a write bitmap indicating whether the data at the certain offset position of the page number of the volatile memory device is written.

2. The electronic device of claim 1, wherein
   a size of each of the plurality of entries is equal to a unit for the host processor to access the volatile memory device once.

3. The electronic device of claim 1, wherein
   a unit size of the mapping table is a value obtained by multiplying a page unit by m, where m is a natural number.

4. The electronic device of claim 1, wherein
   the read bitmap includes m bits,
   setting an x-th bit ($0 \leq x \leq m-1$) from a least significant bit (LSB) in the read bitmap means that data at an x-th offset position in the page number of the volatile memory device is read,
   the write bitmap includes n bits, and
   setting an x-th bit ($0 \leq x \leq n-1$) from the least significant bit (LSB) in the write bitmap means that the data at the x-th offset position in the page number of the volatile memory device is written.

5. The electronic device of claim 1, wherein
   a size of each of the plurality of entries is one of 4 bytes and 8 bytes, and
   a unit size of the mapping table is 64 KB.

6. The electronic device of claim 1, wherein
   the controller is further configured to calculate a page number and a bitmap offset of the non-volatile storage device based on an address included in the command, and determine whether predetermined data corresponding to the calculated page number and bitmap offset is cached in the volatile memory device by using the mapping table,
   the calculated page number of the non-volatile storage device is related to a quotient of dividing the address included in the command by a unit size of the mapping table, and
   the calculated bitmap offset is related to a remainder of dividing the address included in the command by the unit size of the mapping table.

7. The electronic device of claim 6, wherein
the command is a read command, and
in response to determining that the predetermined data is cached in the volatile memory device, the controller is further configured to transmit the cached predetermined data to the host processor.

8. The electronic device of claim 6, wherein
the command is a write command, and
in response to determining that the predetermined data is cached in the volatile memory device, the controller is further configured to update the cached predetermined data based on the write command and set a write bitmap corresponding to the updated predetermined data.

9. The electronic device of claim 6, wherein
in response to determining that the predetermined data is not cached in the volatile memory device, the controller is further configured to cache data corresponding to the calculated page number and bitmap offset of the non-volatile storage device in the volatile memory device and set a read bitmap corresponding to the cached data.

10. The electronic device of claim 1, wherein
the controller is further configured to identify data in which the write bitmap is set in the mapping table, in response to a flush command, and write the identified data to the non-volatile storage device.

11. The electronic device of claim 1, wherein the controller includes:
an address remapper configured to determine whether data corresponding to an address included in the command is cached in the volatile memory device based on the mapping table and translate the address into an address of the volatile memory device by using the mapping table; and
a memory translation controller configured to manage the mapping table.

12. The electronic device of claim 1, wherein
the mapping table is stored in the volatile memory device.

13. A computing system comprising:
a host processor;
a byte-addressable electronic device; and
a non-volatile storage device,
wherein the byte-addressable electronic device includes a volatile memory device, a mapping table storing address information of the volatile memory device corresponding to address information of a non-volatile storage device, and information indicating whether a command related to data access is processed in relation to the address information of the volatile memory device, and a controller connected to the host processor, the volatile memory device, and the non-volatile storage device, and configured to process commands related to data access received from the host processor based on the mapping table,
the mapping table includes a plurality of entries respectively corresponding to a plurality of page numbers of the non-volatile storage device, and
each of the plurality of entries includes:
a page number of the volatile memory device corresponding to a predetermined page number of the non-volatile storage device;
a read bitmap indicating whether data at a certain offset position of the page number of the volatile memory device is read; and
a write bitmap indicating whether the data at the certain offset position of the page number of the volatile memory device is written.

* * * * *